United States Patent [19]

Lowden

[11] 4,453,336
[45] Jun. 12, 1984

[54] FISH LINE RELEASE MECHANISM

[76] Inventor: Roger G. Lowden, 178 Huffer Rd., Hilton, N.Y. 14468

[21] Appl. No.: 384,013

[22] Filed: Jun. 1, 1982

[51] Int. Cl.³ .............................................. A01K 91/00
[52] U.S. Cl. .................................. 43/43.12; 43/44.87; 43/44.92; 24/532
[58] Field of Search ................ 43/43.12, 44.87, 44.89, 43/44.92, 44.95, 44.83; 24/115 G, 115 M, 129 D, 135 A, 135 L, 135 N, 255 SL, 260, 255 BS

[56] References Cited

U.S. PATENT DOCUMENTS

| 755,683 | 3/1904 | Miller | 43/44.91 |
|---|---|---|---|
| 2,015,404 | 9/1935 | Kiddle | 24/129 D |
| 3,835,573 | 9/1974 | Borchardt | 43/43.12 |
| 3,905,148 | 9/1975 | Naone | 43/43.12 |
| 3,959,913 | 6/1976 | Weber | 43/43.12 |
| 4,010,569 | 3/1977 | Finley | 24/129 D |

FOREIGN PATENT DOCUMENTS 665860 10/1938 Fed. Rep. of Germany ... 24/135 N

Primary Examiner—Nicholas P. Godici
Assistant Examiner—Marc Hodak
Attorney, Agent, or Firm—Robert J. Bird

[57] ABSTRACT

A fishing line release mechanism for use with a trolling cable, including a body of resilient material having a cable passage for sliding fit onto a trolling cable. The wall of the cable passage is slit so that the mechanism can be pressed or snapped onto and off of the cable. A pair of jaws which engage each other at their tips are pressed together by an adjusting screw. The jaws form a passage for a fishing line which releases from the cavity formed by the jaws when tension is applied by a striking fish.

In one embodiment, the cable passage includes means to resiliently clamp the mechanism to the cable so that several such devices can be attached as desired for stacking.

2 Claims, 9 Drawing Figures

FISH LINE RELEASE MECHANISM

BACKGROUND OF THE INVENTION

This invention relates to a fish line release mechanism for holding a line at a predetermined depth below the surface of the water while trolling and for releasing the line at a predetermined tension, as when a fish strikes.

One common method of fishing is known as downrigger fishing or downriggering. In this method, a downrigger cable extends straight downward in the water, from a boat on the surface, and includes a relatively heavy downrigger weight at the end to keep the line in a vertical or nearly vertical attitude in the water while the boat moves forward for trolling. A fishing line from a fishpole on the boat extends downward along the downrigger cable and is releasably attached to the cable at a desired depth below the surface of the water. More than one such fishing line can be attached to the downrigger cable, each at its own depth and with its own releasable attachment to the cable. Several fishing lines thus releasably attached to a single downrigger cable is known as stacking.

The present invention will be described as a single or individual line release mechanism, holding a single fishing line to the downrigger cable. It will be understood however that several such release mechanisms may be used with a single downrigger cable in a stacking mode. In fact, the ease with which this apparatus can be used for stacking is one of its advantages.

The present invention is directed to the line release, mounted on the downrigger cable and releasably holding the fishing line to the cable at a particular depth. Various devices for the same general purpose are known to the prior art.

One such device is known as the Mac-Jac. It includes a release button which is snapped into and out of a spring clip which somewhat resembles a safety pin. The release button is similar to a small spool, the fishing line passing through the central aperture of it, with the spring clip in a partial embrace around its circumference. The spring clip portion of this device rides freely up and down the downrigger cable and therefore requires additional means to position it at a desired point on the cable.

Another device used for releasably holding a fishing line to a downrigger cable is the Auto-Trac 4-way rudder release. The Auto-Trac includes a plastic plate member attached to the downrigger cable and having a series of release notches of slightly graduated diameter to engage a release button or spool through which the fishing line passes. The release button can be set in any of the four notches depending on the tension at which it is desired to release the fishing line.

The Roemer Release is yet another device for releasably holding fishing line to a downrigger cable. The Roemer is a relatively complex mechanism and reference is made to U.S. Pat. No. 4,221,068, issued to Leonhard J. Roemer on Sept. 9, 1980 in which this device is fully described.

The Black Release is still another prior art device for releasably holding fishing line to downrigger cable. The Black includes a body member which is threaded onto a downrigger cable and a release arm pivoted at one end to the body. The "free" end of the release arm is held in place between two jaws which are adjustably urged together by an adjusting screw. Sufficient tension on the fishing line, which passes under the release arm on its way to the lure, pulls the free end of the release arm free of the jaws in which it is set.

The foregoing items are cited herein as representative of the state of the art.

SUMMARY OF THE INVENTION

It is an object of this invention to provide a fishing line release with fully adjustable release tension.

Another object is to provide a line release which is easily attachable and detachable from a downrigger cable, at desired positions on the cable for stacking.

Another object is to provide a line release which is easily positioned on a downrigger cable for stacking and which is automatically released from its stacking position when the cable is raised.

Other objects, advantages and features of this invention will become apparent from the following more detailed description thereof, taken in connection with the accompanying drawing:

The present invention can be summarized as a fishing line release mechanism for connection to a downrigger or outrigger trolling cable. The mechanism includes a body of resilient material having a cable passage adapted for snap and sliding fit onto a trolling cable and a pair of jaws engaging at their inwardly extending tips to define a fishing line passage. The jaws are adjustably pressed together by a screw mechanism for full adjustability of the fish line release tension. The cable passage, in one embodiment, includes resilient clamping pads which are screw tightened to fasten the mechanism to the trolling cable, whereby several such devices can be stacked at desired locations on the cable. The clamping arrangement is automatically released by raising the trolling cable.

DRAWING

DESCRIPTION

Figure 1:
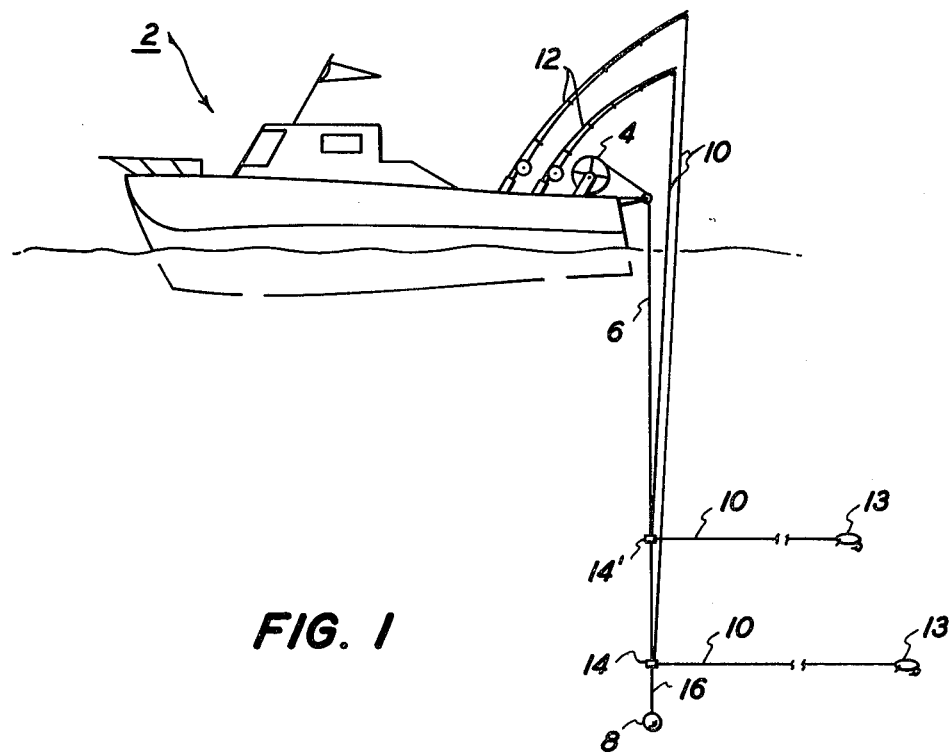
FIG. 1 is a schematic diagram of a boat floating on water with a downrigger apparatus and two fishing rods at its stern.

Referring now to FIG. 1, a boat is generally indicated at 2 and includes a downrigger apparatus 4 at the stern of the boat, which apparatus includes a boom and reel for the purpose of letting down and taking up a downrigger cable 6 which extends down into the water as shown. A downrigger weight 8 is attached to the end of the cable 6 to hold the cable in a generally vertical attitude in the water as the boat moves.

A fishing line 10 extends from a first fishing rod 12 on the boat and down into the water along the downrigger cable to a line release mechanism 14 according to this invention, and rearward therefrom to a hook and lure 13. The line release mechanism 14 is spaced from the downrigger weight 8, to avoid mechanical interference, by an appropriate spacer or swivel member 16 which connects the weight 8 to the cable 6.

The detail of the line release mechanism 14 will now be described in connection with FIGS. 3 and 4. The line release mechanism includes a body 18 of a resilient thermoplastic or elastomeric material. The body 18 includes a cable passage or aperture 20 extending vertically through the body. A narrow slit 22, as might be formed by a sharp blade, is formed through the wall of body 18 and into the aperture 20. The slit 22 permits the cable 6 to be inserted into the cable passage 20. Once the cable 6 is snapped or pressed into the cable passage 20, the resilient material of body 18 returns to its normal configuration, i.e., the slit 22 closes to encircle the cable 6 within the cable passage 20. The relative diameters of cable 6 and cable passage 20 are such that the body 18 moves freely along the cable. In short, the slit 22 is provided so that the resilient body 18 will snap fit over a downrigger cable 6.

The body 18 also includes a pair of jaws 24, 26 extending outwardly from the end of the body opposite to that through which the cable passage 20 is located. Jaws 24 and 26 terminate respectively at inwardly extending tips 28, 30. Tips 28 and 30 are normally in engagement with each other so that the jaws and tips together define a normally closed fishing line aperture 32. The fishing line 10, extending downwardly from the boat, passes through the line aperture 32 and then rearwardly to the hook and lure. Some amount of tension in the fishing line 10, as when a fish strikes, will release the line between the tips 28, 30 of the resilient jaws 24, 26.

A line tension adjusting screw 34 passes through the jaws 24 and 26. Adjusting screw 34 may be a thumbscrew, as shown, or a bolt with a wing nut, or some other form of screw type fastener for the purpose of clamping down on the jaws 24, 26 to adjust the force with which the tips 28 and 30 engage each other, thereby to adjust the release tension in the fish line 10. Tips 28, 30 may be steel-tipped, or may be steel balls, but as shown in the drawing, the tips are simply extensions of the same material as the rest of body 18.

Figure 3:
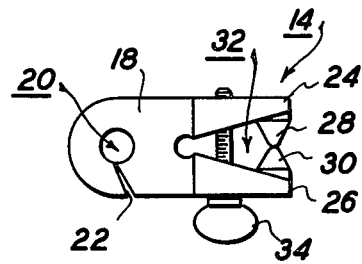
FIGS. 3 and 4 are top plan and side elevation views, respectively, of a line release mechanism in one form of the present invention.
Figure 4:
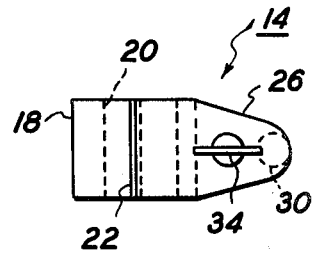

The cable aperture 20 may be a simple cylindrical passage as shown in FIGS. 3 and 4. In such a simplified embodiment, the line release mechanism 14 is freely slidable up and down along the downrigger cable and in use, rests upon the spacer 16 at the lower end of the downrigger cable 6.

Figure 5:
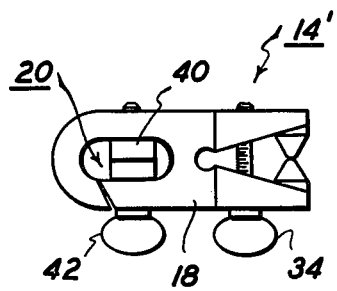
FIGS. 5 and 6 are top plan and side elevation views, respectively, of a line release mechanism in a second embodiment of this invention.
Figure 6:
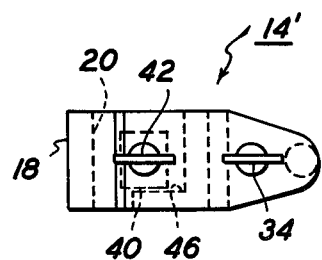
Figure 8:
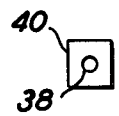
FIGS. 8 and 9 are details of a single clamp pad which is a part of the embodiment shown in FIGS. 5 and 6.
Figure 9:
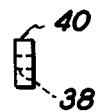
Figure 7:
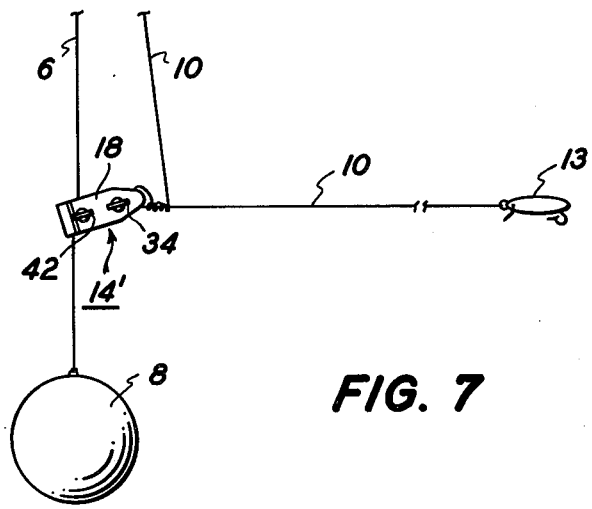
FIG. 7 is a detailed view illustrating the cooperative action of a downrigger apparatus and the line release to automatically release the device from a stacked position on the downrigger cable.

FIGS. 5 and 6 represent, respectively, the top and side views of a second embodiment of this invention, this one capable of use in a stacking mode. In this embodiment of FIGS. 5 and 6, the cable aperture 20 includes a squared recess or seat in which are seated a pair of rectangular clamp pads 40. A single clamp pad 40 is shown in detail in FIGS. 8 and 9. It consists simply of a square or rectangular piece of rubber or other resilient material, having a central passage 38. Referring back to FIGS. 5 and 6, a cable clamp screw 42 extends through the mechanism, from one side to the other, and through the two cable cable clamp pads 40. As in the case of the line adjusting screw 34, the cable clamp screw 42 may be a thumbscrew as shown; or a bolt with a wing nut, or some other form of screw type fastener for clamping down on the clamp pads 40 and cable 6.

When the cable clamp screw 42 is backed off and the cable clamp pads 40 are not compressed, a downrigger cable 6 in the cable passage 20 can be worked or manipulated into position between the two clamp pads 40. When the pads thus embrace the cable, the clamp screw 42 is tightened, pressing the resilient side of the body 18 against the clamp pads and frictionally clamping the pads and the mechanism 14 to the cable 6. By this means, the line release mechanism 14 is positionable at any point on the downrigger cable 6. Several of these line release mechanisms can be stacked on a downrigger cable by thus attaching them at different points along the cable.

When the line release mechanism 14 is thus clamped to the cable 6, it assumes a position tilted upward to the right relative to the vertical. The mechanism is easily released from its clamped connection to the cable, either by a simple manual impact or by impact of the body 18 against the arm of the downrigger apparatus 4 when the cable 6 is raised. Such contact will snap the cable out of the group of the clamp pads 40 and the release mechanism will slide freely down the cable.

The objects of this invention, to provide a fishing line release with fully adjustable release tension, which is easily attachable and detachable from a downrigger cable for stacking, and which is automatically released from its stacking position when the cable is raised, are all realized by the invention described above. The embodiment described in connection with FIGS. 3 and 4 is a simplified device providing the desired fully adjustable release tension and simple attachment to, and detachment from, a downrigger cable. The more elaborate embodiment described in connection with FIGS. 5 and 6 provides, in addition to the above, the clamping feature for stacking and the automatic release from the clamped position.

Figure 2:
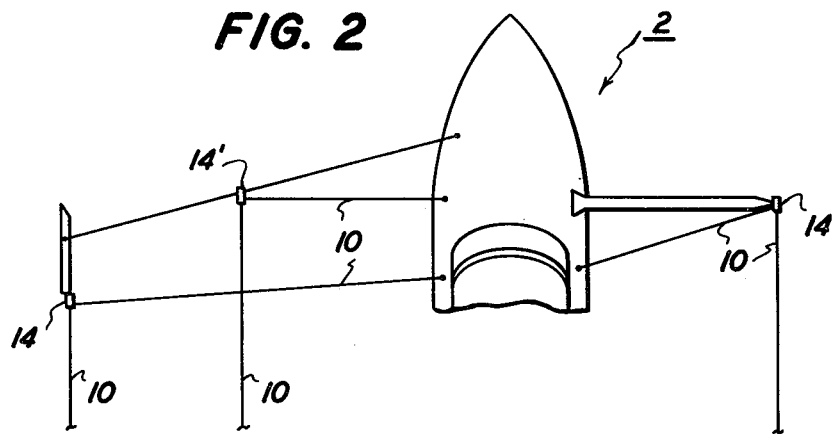
FIG. 2 is a plan view of a boat equipped with an outrigger apparatus on its starboard side and a side planer apparatus on its port side.

The line release mechanism of this invention has been described in the environment of a downrigger apparatus. It is also contemplated, and FIG. 2 represents, that the line release mechanism of this invention may also be used with an outrigger system, generally represented on the right or starboard side in FIG. 2 or with a sideplaner system, generally represented on the left or port side in FIG. 2. The details of outriggers and sideplaners are well known and need not be further described here. It is sufficient to point out that in each case, a fishing line 10 is releasably attached to an outrigger or sideplaner system by means of the line release mechanism 14 of this invention.

In the specification, the terms downrigger cable, outrigger cable, and sideplaner have been used as well known terms in the art. For the purpose of the following claims, the term "trolling cable" will be used as a generic term to include all such cables as are currently known in the art of trolling. Also, the adjusting screws for the cable passage and the fishline aperture have been exemplified as being thumbscrews or bolts with wing nuts. These examples are given by way of illustration and it will be understood that there are numerous equivalent mechanical means to accomplish the same purpose of adjustably pressing down on the resilient members of the structure of this invention.

I claim:

1. A fishing line release mechanism for connection to a trolling cable, including:
   a body of resilient material defining a cable aperture for a sliding fit of said body around said cable and a narrow slit along the length of said aperture to permit said body to be resiliently pressed into said sliding fit on said cable, a resilient clamping means to releasably clamp said body onto said trolling cable for stacking a plurality of said mechanisms at desired points on said trolling cable, said clamping means including a clamp screw for establishing and adjusting compression in said clamping means, said body including a pair of opposed jaws defining between them a line aperture for the free passage therethrough of a fishing line, said jaws each including an inwardly extending tip, said tips being in engagement with each other so that said line aperture is normally closed, and means to urge said jaws against each other at their tips and to vary the compression of said tips against each other to thereby adjust the release tension required to open said jaws and release said fishing line.

2. A fishing line release mechanism for connection to a trolling cable, including:

a body of resilient material defining a cable aperture for a sliding fit of said body around said cable and a narrow slit along the length of said aperture to permit said body to be resiliently pressed into said sliding fit on said cable, said body further defining a recess to seat a resilient clamping means to resiliently clamp said body onto said trolling cable at a desired point on said trolling cable whereby a plurality of said mechanisms can be stacked on said trolling cable, said clamping means including a pair of clamping pads seated in said recess adjacent to said cable aperture and means to press said clamping pads into clamping engagement with said cable, said body including a pair of opposed jaws defining between them a line aperture for the free passage therethrough of a fishing line, said jaws each including an inwardly extending tip, said tips being in engagement with each other so that said line aperture is normally closed, and means to urge said jaws against each other at their tips and to vary the compression of said tips against each other to thereby adjust the release tension required to open said jaws and release said fishing line.

* * * * *